(12) United States Patent
Abdo

(10) Patent No.: US 6,907,548 B2
(45) Date of Patent: Jun. 14, 2005

(54) AUTOMATIC TESTING FOR MULTI-CORE ARCHITECTURE

(75) Inventor: Ayman G. Abdo, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 588 days.

(21) Appl. No.: 10/038,843

(22) Filed: Jan. 2, 2002

(65) Prior Publication Data

US 2003/0126515 A1 Jul. 3, 2003

(51) Int. Cl.[7] .................................................. G06F 11/00
(52) U.S. Cl. ........................................ 714/43; 714/30
(58) Field of Search .............................. 714/43, 30, 27, 714/32, 56, 733, 738, 742, 47, 31, 39, 18, 727; 709/107, 108, 213

(56) References Cited

U.S. PATENT DOCUMENTS

| | | | | |
|---|---|---|---|---|
| 5,596,734 A | * | 1/1997 | Ferra | 710/5 |
| 6,134,675 A | * | 10/2000 | Raina | 714/37 |
| 6,496,880 B1 | * | 12/2002 | Ma et al. | 710/38 |
| 6,550,020 B1 | * | 4/2003 | Floyd et al. | 714/10 |
| 6,732,311 B1 | * | 5/2004 | Fischer et al. | 714/737 |
| 2002/0083387 A1 | * | 6/2002 | Miner et al. | 714/726 |
| 2003/0005380 A1 | * | 1/2003 | Nguyen et al. | 714/736 |
| 2003/0126531 A1 | * | 7/2003 | Tu et al. | 714/726 |

* cited by examiner

*Primary Examiner*—Nadeem Iqbal
(74) *Attorney, Agent, or Firm*—Blakely, Sokoloff, Taylor & Zafman LLP

(57) ABSTRACT

A test circuit disposed between a common bus and the cores of a multi-core computer permits post-silicon validation in the form of controlled stress testing of the system. The test circuit may block data requests from one or more selected cores and issue test data requests into the system instead, resulting in a more controllable test environment. In one embodiment, the test circuit is programmed and monitored from an external device through an integrated test port.

25 Claims, 4 Drawing Sheets

AUTOMATIC TESTING FOR MULTI-CORE ARCHITECTURE

BACKGROUND OF THE INVENTION

1. Field of the Invention

The invention pertains generally to computers. In particular, the invention pertains to testing computers that have multi-core architecture.

2. Description of the Related Art

Multi-core computers include at least two cores connected to other parts of the system through a common interface. A 'core' in this context includes a processor and typically also includes one or more levels of cache memory dedicated to the processor, while additional levels of cache memory may be shared by the processors of multiple cores over a common bus. Each core can execute instructions and send data requests over the common bus independently of the other cores, with arbitration logic to determine which core obtains access to the common bus. However, each core is indirectly affected by the transactions of the other cores because of congestion that results when heavy data traffic from the multiple cores exceeds the bandwidth of the common bus. The hierarchy of shared and non-shared cache memories can also cause congestion. For each transaction issued from one of the cores to its dedicated cache, snoop logic may send a query request to the other cores to check their dedicated caches for data coherency. In addition to causing congestion on the common bus, such requests, referred to as self-snoop, are an overhead burden for the cores since self-snoop adds to the requests that the cores need to process. If a query request hits a modified cache line in a core, the core must write-back the line to update other caches, adding to the overhead burden of the cores. With multiple cores each generating requests and triggering self-snoop operations, the cache memories and bus logic can be overwhelmed by too much data traffic, creating bottlenecks in the processing operations of the system.

In addition to data bandwidth considerations, the order in which transactions are placed on the bus may also affect performance. This order may be affected by the interaction of various parts of the system during periods of heavy data traffic.

Post-silicon data-flow stress testing is used to determine the effects of such heavy data traffic in a multi-core computer system by generating high levels of activity in the cache memories and over the common bus. Conventional testing relies on instruction-level tests running in each core, hoping to get the desired interaction between the cores. Unfortunately, since each core operates relatively independently of the other cores, achieving the desired level of interaction is both difficult and hard to measure with instruction-level tests executed from the cores.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Various embodiments include a test circuit between the cores and the common bus of a multi-core system to stress test the system by generating known levels of activity on the common bus and/or in the cores, as well as in other parts of the system. Stress testing may include generating high levels of specific data activity in the associated areas under controlled conditions to determine how well the system handles those high levels of data activity. Stress testing can also include testing timing relationships between multiple data requests competing for the same resources. In one embodiment, the testing is controlled by the contents of one or more test registers, which may be programmed to perform one or more specific tests.

The invention may be implemented in one or a combination of hardware, firmware, and software. The invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Figure 1:
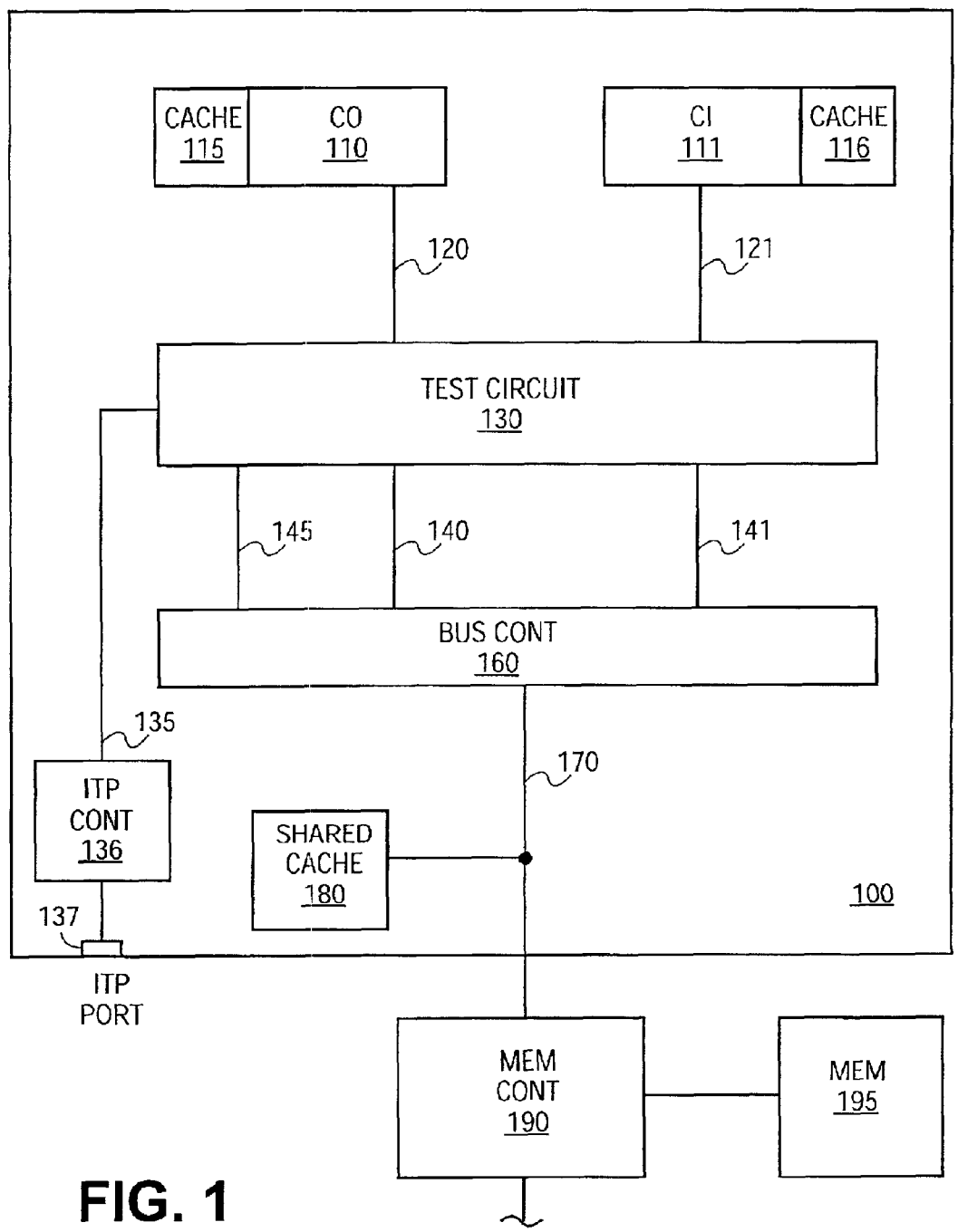
FIG. 1 shows a block diagram of a multi-core computer system with a test circuit according to one embodiment of the invention.

FIG. 1 shows a block diagram of a multi-core computer system with a test circuit according to one embodiment of the invention. In the illustrated embodiment, multi-core computer 100 includes core C0, core C1, test circuit 130, bus controller 160, shared cache 180, integrated test port (ITP) 137, and ITP controller 136. In one embodiment, core C0, core C1, test circuit 130, bus controller 160, shared cache 180, and ITP controller 136 are all on a single integrated circuit, but other embodiments may have other physical distributions of the components. In the embodiment shown, core C0 includes a processor 110 and dedicated cache 115 while core C1 includes a processor 111 and a dedicated cache 116. While the illustrated embodiment shows a dedicated cache 115 for core C0, a dedicated cache 116 for core C1, and a shared cache 180, other embodiments may eliminate one or more of these caches, or may include additional caches not shown.

Although two cores are shown, one of ordinary skill in the art will appreciate that three, four, or more cores may also be included in a similar manner. Each core may communicate with other devices in the system by issuing data requests to those devices through bus controller 160. In an exemplary embodiment, core C0 may issue data requests through path 120, 140 while core C1 may issue data requests through path 121, 141. Bus controller 160 may then pass these data requests on to the target devices (such as main memory 195 through memory controller 190) over common bus 170.

Each core may also issue data requests that are seen only by the core's own dedicated cache, but those do not pass through bus controller 160 or test circuit 130, and are not discussed herein. Bus controller 160 may also route data requests from one core to another core. Bus controller 160 may have the necessary logic to arbitrate between competing requests based on a predefined priority order, including data requests received from devices that are not illustrated and that are external to multi-core computer 100.

Test circuit 130 is disposed between the cores and bus controller 160 where test circuit 130 may control the data requests. In one embodiment, test circuit 130 may perform operations including, but not limited to: (1) passing one or more data requests from a core to bus controller 160 unchanged; (2) blocking one or more data request from one or more selected cores to bus controller 160; and (3) originating one or more test data requests in test circuit 130 and sending the test data requests to bus controller 160. One of ordinary skill in the art will appreciate that a data request sent to bus controller 160 may pass through bus controller 160 en route to the target device addressed by the data request.

Whether a data request is from a core or from test circuit 130, in various exemplary operations the data request may have various forms including but not limited to: (1) a command; (2) a read request to a specified address; and (3) a write request to a specified address. An address may be a memory address and may also be a device address of a device in the computer system.

The operation of test circuit 130 may be programmed by writing the proper test data to test circuit 130 and the results of a given test may be read from test circuit 130 by reading one or more specific locations in test circuit 130. In one embodiment, a test may be programmed by writing the test data through an integrated test port (ITP) 137 and an ITP controller 136, over path 135, and the test results may be read through the ITP controller 136. The ITP controller 136 may also include circuitry to control other tests in multi-core computer 100. In one embodiment, the ITP controller 136 is inaccessible to the end user and is used only during manufacture and/or assembly, but other embodiments may make the ITP controller usable by the end user. In other embodiments, testing may be conducted by writing and reading to/from test circuit 130 through logic other than ITP controller 136.

During an exemplary stress test, data requests for a read operation may cause data to be retrieved from elsewhere in the system and be written to test circuit 130 over path 145. Test circuit 130 may also use path 145 to monitor transactions going through bus controller 160 and to detect the presence of a particular data request going through bus controller 160.

Figure 2:
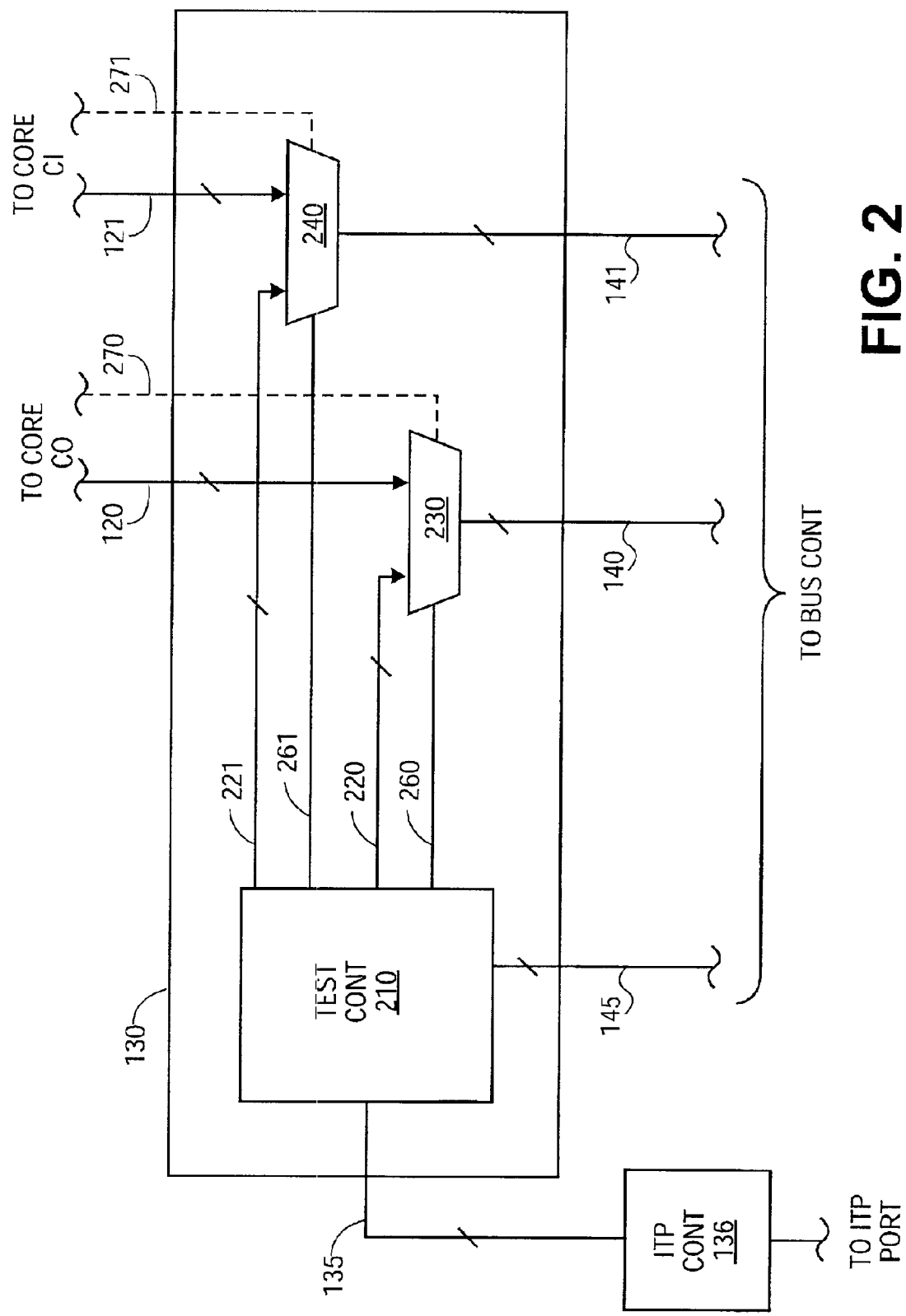
FIG. 2 shows a block diagram of the details of a test circuit according to one embodiment of the invention.

FIG. 2 shows a block diagram of the details of a test circuit according to one embodiment of the invention. In the illustrated embodiment of FIG. 2, exemplary test circuit 130 includes test controller 210 and switching logic in the form of multiplexers 230, 240. In one test operation, test circuit 130 is used only for pre-silicon validation of the operation of multi-core computer 100 and is deactivated before placing multi-core computer 100 into a final product. One embodiment may be arranged such that a power-up or reset signal places test circuit 130 in an idle (no-testing) mode, and only commands received through the ITP port may change test circuit 130 to a test mode, effectively disabling the test operations when multi-core computer 100 is in a normal operating environment. In another embodiment, test circuit 130 may be permanently disabled after testing, for example by blowing a fuse link. It should be understood that various other techniques may be used to disable test controller 210 at the conclusion of testing.

In the embodiment shown in FIG. 2, multiplexer 230 selectively permits data requests along path 120 from core C0, or test data requests along path 220 from test controller 210, to be passed on to bus controller 160 along path 140. While in one embodiment each of paths 120, 220 and 140 is a parallel bus or equivalent, other embodiments may use other arrangements for paths 120, 220 and 140. In one embodiment, only test controller 210 determines which input of multiplexer 230 is selected by control line 260, thus allowing test controller 210 complete control over the source of requests on path 140. In another embodiment, another control line 270 (shown in phantom) allows core C0 to select the input of multiplexer 230, thus allowing core C0 to control the source of requests on data path 140. In case of a conflict between control line 260 and control line 270, a priority scheme may be implemented to determine which control line will prevail. It should be understood that other embodiments may provide for other control schemes.

In a similar manner, in the embodiment shown in FIG. 2 multiplexer 240 has one data input from core C1 on path 121 and another data input from test controller 210 on path 221. Requests on the selected path are passed on to data path 141 to bus controller 160. In one embodiment controller 210 has sole control, via control line 261, to determine which input of multiplexer 240 is selected. In another embodiment, alternate control line 271 permits core C1 to determine which input of multiplexer 240 is selected, with a priority scheme resolving any conflicts between the two. It should be understood that other embodiments may provide for other control schemes.

Figure 3:
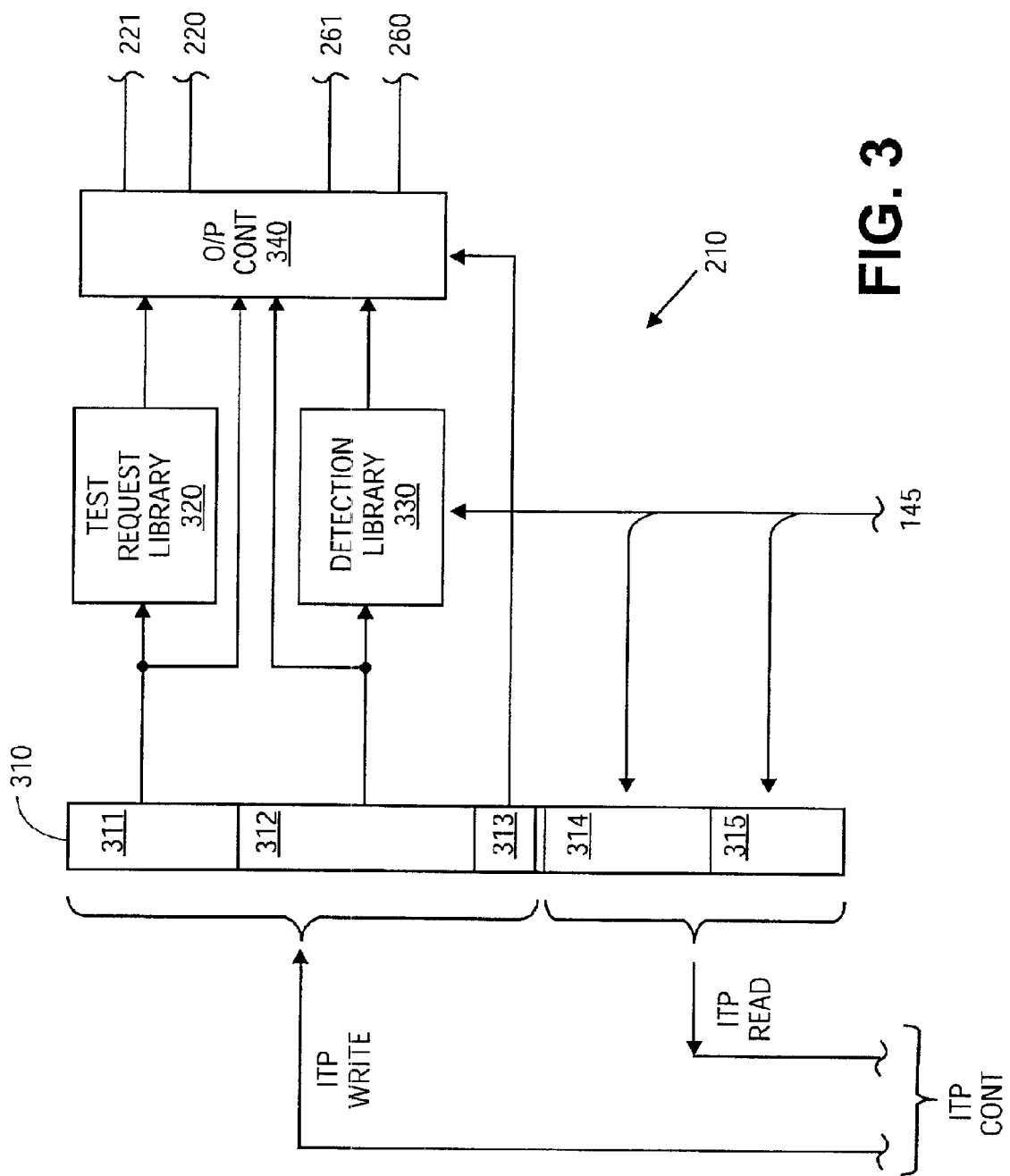
FIG. 3 shows a block diagram of a test controller according to one embodiment of the invention.

FIG. 3 shows a block diagram of a test controller according to one embodiment of the invention. In the illustrated embodiment, test controller 210 includes an output controller 340, test request library 320, detection library 330, and test register 310. In an exemplary embodiment, test register 310 includes a response section 311, a detection section 312, and an on/off section 313, all of which may be written into by the ITP controller 136 to specify the test to be performed. In the same exemplary embodiment, the test register 310 also has a results data section 314 and a counter section 315 which may be read by the ITP controller 136 to determine the results of the test. While in one embodiment test register 310 is implemented as a single register, in another embodiment test register 310 may be implemented as a first register having sections 311, 312, and 313, and a second register having sections 314, 315. Other configurations of test register 310 may also be implemented.

Figure 4:
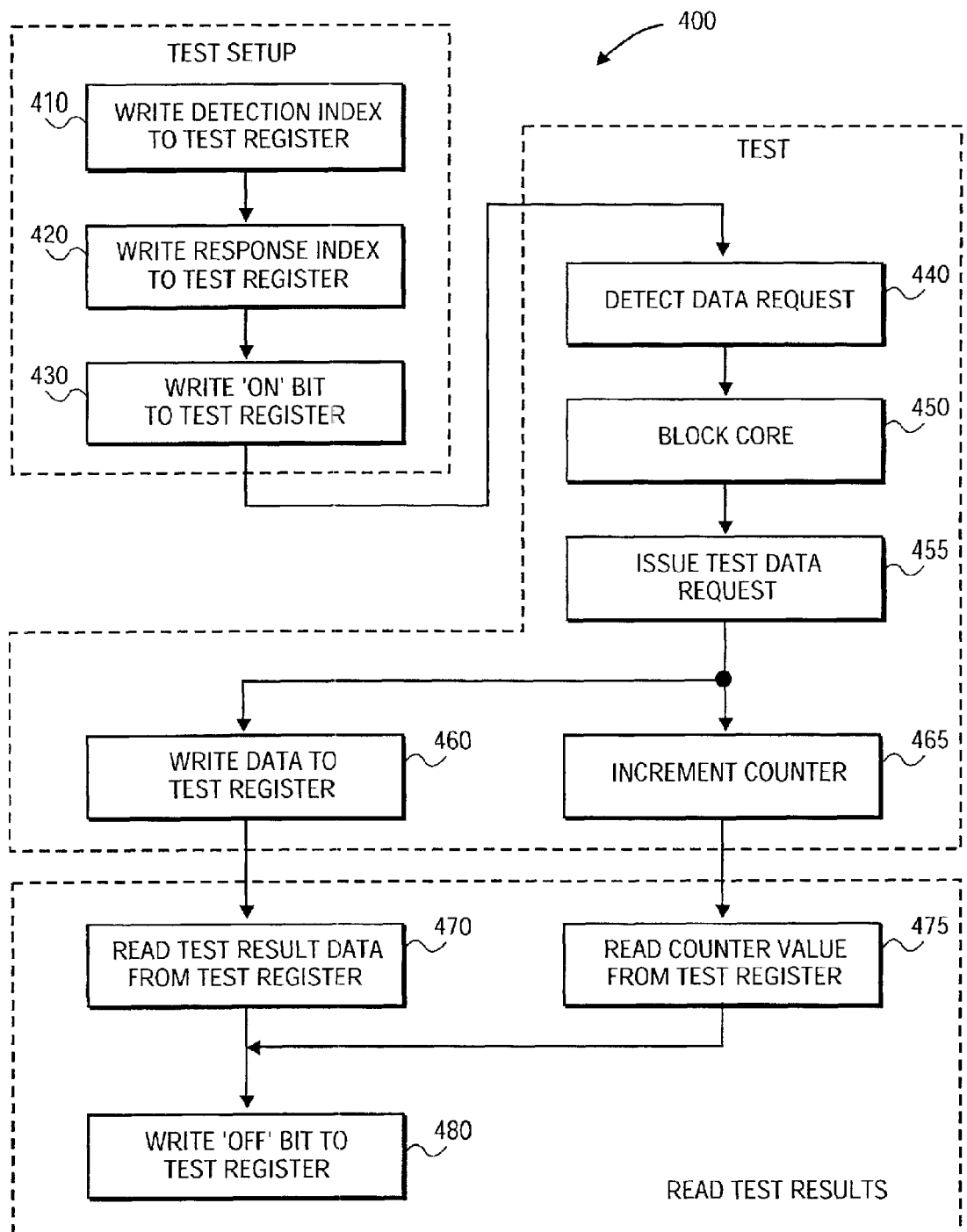
FIG. 4 shows a flow chart of the operation of the test controller of FIG. 3 according to one embodiment of the invention.

FIG. 4 shows a flow chart of the operation of the test controller of FIG. 3 according to one embodiment of the invention. In the following paragraphs, the operational description of flow chart 400 in FIG. 4 makes reference to the components of FIG. 3. However, the operations of FIG. 4 may be performed with a different structure than shown in FIG. 3, and the structure of FIG. 3 may be used to perform operations different than shown in FIG. 4. Flow chart 400 presents a method in which the described operations are performed. Flow chart 400 may also be applied to exemplary instructions on a medium, which when read from the medium and executed by one or more processors will cause the described operations to be performed, as previously described.

In the exemplary operation of FIG. 4, blocks 410-430 represent a test setup operation. While in one embodiment test setup is performed through the ITP controller 136, other embodiments may perform the test setup in other ways. At block 410, a detection index is written to detection section 312 of test register 310. The contents of the detection index may select one or more of the entries in detection library 330 to use in the current test. In one embodiment, the contents of detection library 330 are specific to the particular type/model of multi-core computer 100, and the contents of detection section 312 select a subset of that library for use in the current test. In one embodiment, each bit position in detection section 312 is associated with a specific entry in test request library 320, but other embodiments may use other selection logic.

The one or more selected entries in detection library 330 may be used for comparison matching with data requests being issued through bus controller 160. The data requests monitored over path 145 may be compared to the selected contents of detection library 330 to find a match. If a match is found, a start signal may be sent to output controller 340 to trigger the output of one or more test data requests over path 220 and/or 221. While in one embodiment detection library 330 includes a content addressable memory (CAM), other embodiments may use other types of data-matching logic. If test data requests are to be output without waiting for a match, the contents of detection section 312 may be programmed to cause the start signal to be issued immediately. While in one embodiment the entries in the detection library 330 match every bit of the triggering data requests, in another embodiment the entries in detection library 330 include only enough bits to identify the desired triggering data requests.

At block 420 of the exemplary operation of FIG. 4, a response index is written to response section 311 of test register 310. The contents of the response index may be used to select one or more of the entries in test request library 320 to use in the current test. In an exemplary embodiment, the contents of test request library 320 are specific to the particular type/model of multi-core computer 100, and the contents of response section 311 select a subset of that library for use in the current test. In one embodiment, each bit position in response section 311 is associated with a specific entry in test request library 320, but other embodiments may use other selection logic.

Detection library 330 and test request library 320 may include various types of memory, including but not limited to: 1) read-only memory (ROM), 2) programmable read-only memory (PROM), 3) electrically-erasable read-only memory (EEROM), etc.

At block 430 of the exemplary operation of FIG. 4, a test is initiated by writing a code representing the 'on' state into on/off section 313. Control of on/off section 313 may be used to start and stop individual tests. After testing is complete, on/off section 313 may be placed in a permanent 'off' state to disable all future testing by test controller 210. In one embodiment section 313 has a single bit position, with a logic '1' bit representing the 'on' state and a logic '0' bit representing the 'off' state, but other embodiments may use other codes to represent 'on' and 'off'. In the embodiment described above, blocks 410, 420, and 430 represent separate write operations, but in another embodiment blocks 410–430 are all performed in a single write operation.

In the exemplary embodiment of FIG. 4, blocks 440–465 represent the execution of the test that was set up in blocks 410–430. At block 440, data requests passing through bus controller 160 are monitored for a match with any of the data requests selected from detection library 330. If a match is found, control moves to block 450. In a test that does not depend on detecting a particular data request before starting, block 440 may be skipped and block 450 may be executed immediately after the test is initiated. At block 450, cores C0 and/or C1 are blocked by multiplexers 230 and/or 240 so that any data requests issued by those cores will not reach bus controller 160. At block 455, test controller 210 issues test data requests to bus controller 160. In an exemplary test, the test data requests are issued through each multiplexer that was used to block data requests from the cores in block 450.

In one test operation, direct connections from the response section 311 and the detection section 312 to output controller 340 permit output controller 340 to selectively output specific entries from test request library 320 in response to detection of specific data requests by detection library 330. In another test operation, the output controller 340 merely reissues the detected data request, with changes in the reissued data request that may include, but are not limited to, one or more of the following: 1) a different address, 2) different data, 3) no change.

Various tests may be performed by issuing one or more test data requests at block 455. In the exemplary embodiment of FIG. 4, part of a test includes placing results data in test controller 210 so the results of the test may be read. Blocks 460 and 465 show two mechanisms of placing results data in test controller 210. In one embodiment, test register 310 may include results data section 314 but not counter section 315 and perform only the operation of block 460. Another embodiment may include counter section 315 but not results data section 314 and perform only the operation of block 465. The embodiment shown in FIG. 4 includes both sections, and may perform either/both of the operations of block 465 and block 460.

In an exemplary operation of block 460, results data may be written over path 145 into results data section 314 of test register 310, which in the exemplary embodiment is an addressable destination in the system and may be written to by any device capable of writing over the bus system. The particular results data, and the interpretation of the data, may depend on the particular test being performed. In one exemplary test operation, a first device external to test controller 210 (e.g., a core that is not being blocked by test circuit 130) writes a data request to a second external device instructing it to write a first data set to results data section 314. Detection of this data request by test controller 210 causes output controller 340 to issue a test data request that writes a second data set into results data section 314 through bus controller 160. The order in which the two sets of data reach results data section 314 may indicate how the system operates in the presence of data requests competing for the same resource.

In an exemplary operation of block 465, each occurrence of a particular event external to test controller 210 may create a signal that increments a counter in counter section 315. While in one embodiment a software value in register 310 is incremented, in another embodiment a hardware counter in test controller 210 is incremented. At the conclusion of the test, the value of the counter may be used to indicate how the system operated under the particular stress conditions created by the test.

In the exemplary embodiment of FIG. 4, blocks 470–480 represent reading the results of the test that was executed in blocks 440–465. If results data was written to results data section 314 in block 460, the results data may be read from results data section 314 at block 470. If a counter value was incremented in counter section 315 in block 465, the counter value may be read from counter section 315 at block 475. While in one embodiment the results are read through ITP controller 136, in other embodiments the results may be read in other ways.

At block 480, the test is ended by writing an 'off' code to on/off section 313 of test register 310. While in the exemplary test of FIG. 4 the 'off' code is written after reading the test results in blocks 470 and/or 475, in another embodiment the off code may be written after execution of blocks 460/465 but before execution of blocks 470/475.

Depending on the particular test that was performed, the results of the test may indicate things that may include, but are not limited to: (1) which of multiple data requests was given a higher priority, and (2) how many data requests of a given type were issued during the test.

The foregoing description is intended to be illustrative and not limiting. Variations will occur to those of skill in the art. Those variations are intended to be included in the invention, which is limited only by the spirit and scope of the appended claims.

I claim:

1. An apparatus, comprising:
    a test controller, coupled between a bus and first and second cores in a multi-core computer, to operate a data flow stress test in the multi-core computer, the test controller having:
        a first multiplexer coupled between the first core and the bus;
        a second multiplexer coupled between the second core and the bus;
        a register to store test information; and
        a control circuit coupled between the register and the first and second multiplexers.

2. The apparatus of claim 1, wherein the test controller includes:
    a test request library; and
    a detection library.

3. The apparatus of claim 1, wherein:
    the control circuit is to select an input of the first multiplexer between a first data request from the first core and a test data request from the control circuit.

4. The apparatus of claim 1, wherein:.
    the control circuit is to select an input of the second multiplexer between a first data request from the second core and a test data request from the control circuit.

5. The apparatus of claim 1, wherein:
    the test controller is to be electrically deactivated after the stress test.

6. The apparatus of claim 1, wherein:
    the test controller, first core, and second core are all disposed on a same integrated circuit.

7. A system comprising:
    a memory;
    a multi-core computer coupled to the memory; and
    a test controller, coupled between a bus and first and second cores in the multi-core computer, to operate a data flow stress test in the multi-core computer, the test controller having:
        first switching logic coupled between the first core and the bus;
        second switching logic coupled between the second core and the bus;
        a register to store test information; and
        a control circuit coupled between the register and the first and second switching logic.

8. The system of claim 7, wherein the test controller includes a test request library.

9. The system of claim 7, wherein the test controller includes a detection library.

10. The system of claim 7, wherein:
    the test controller is to be electrically deactivated after the stress test.

11. The system of claim 7, wherein:
    the test controller, first core, and second core are all disposed on a same integrated circuit.

12. A method comprising:
    receiving test setup information at an integrated circuit via an integrated test port;
    initiating a test upon detecting that a data request passing through a bus controller matches a data request at a detection library;
    issuing a test data request; and
    writing test result data to a test register.

13. The method of claim 12, wherein receiving test setup information further comprises:
    writing a detection index to the test register;
    writing a response index to the test register; and
    writing an on code into the test register.

14. The method of claim 12, further comprising:
    blocking data requests issued at a first processor and a second processor after initiating the test.

15. The method of claim 12, further comprising reading the test result data from the test register.

16. The method of claim 12, further comprising writing an off code into the test register to terminate the test.

17. A machine-readable medium that provides instructions, which when executed by a set of one or more processors, cause said set of processors to perform operations comprising:
    receiving test setup information at an integrated circuit via an integrated test port;
    initiating a test upon detecting that a data request passing through a bus controller matches a data request at a detection library;
    issuing a test data request; and
    writing test result data to a test register.

18. The medium of claim 17, wherein receiving test setup information further comprises:
    writing a detection index to the test register;
    writing a response index to the test register; and
    writing an on code into the test register.

19. The medium of claim 17, further comprising:
    blocking data requests issued at a first processor and a second processor after initiating the test.

20. The medium of claim 17, further comprising reading the test result data from the test register.

21. The medium of claim 17, further comprising writing an off code into the test register to terminate the test.

22. A machine-readable medium that provides instructions, which when executed by a set of one or more processors, cause said set of processors to perform operations comprising:
    obtaining test data for stress testing a multi-core computer system;
    writing the test data to a test register in the multi-core computer system through a test port; and
    reading a test result from the test register through the test port.

23. The medium of claim 22, wherein:

said writing includes writing an 'on' bit to the test register.

24. The medium of claim 22, wherein:

said writing includes specifying data requests to be monitored as triggers to start a test.

25. The medium of claim 22, wherein:

said writing includes specifying test data requests to be issued.

* * * * *